Patented Feb. 16, 1943

2,311,289

UNITED STATES PATENT OFFICE 2,311,289

METHOD OF INCREASING THE PLASTICITY OF PORTLAND CEMENT MIXTURES

Robert Ben Booth, Springdale, Conn., assignor to American Cyanamid Company, New York, N. Y., a corporation of Maine No Drawing. Application May 21, 1940, Serial No. 336,360

2 Claims. (Cl. 106—92)

This invention relates to a method of increasing the plasticity of Portland cement mixtures.

One of the serious problems in the concrete industry lies in the lack of plasticity of ordinary Portland cement mixtures used in concrete. This lack of plasticity makes it necessary either to use larger amounts of water than would otherwise be necessary or makes for an insufficient flow. In either event the concrete is not as dense and is not as satisfactory. A number of types of compounds have been used in order to increase the plasticity of cement. Many of these compounds, however, while increasing the plasticity of the cement mixtures have an adverse effect on the strength of the cement. In general, plasticity is measured by a percentage of slump of a test cone. Practically all compounds which have been used in the past to increase plasticity have had an adverse effect on the strength. However, unless the adverse effect is material, this is not of great importance and as a practical matter unless the strength of the cement either on 7 or 28 day strength tests is changed more than 10%, the effect is not to be considered of any serious practical significance because the factors entering into the strength of a given strength test sample of concrete even when using cement from the same lot, are sufficiently complicated so that exact checks on strength are not possible. For practical purposes, therefore, any strength within 10% may be considered as within the experimental error or normal variation.

The present invention is based on the use of black liquor soap from the black liquor obtained as a waste product in the manufacture of kraft paper by the sulfate process. Black liquor soap is a crude mixture of the sodium salts of abietic and similar resin acids and unsaturated fatty acids such as oleic, linoleic, and the like. Crude black liquor soap is also contaminated with certain unsaponifiable materials such as phytosterols and the like. A portion of the impurities in crude black liquor soap may be removed by washing with water, liquors containing sodium sulfate, and the like.

Black liquor soap, either crude or washed, is a powerful plasticizer; slump increases up to 420% or more can be obtained by the use of 0.1% of crude black liquor soap. However, when such amounts are used the strength is adversely affected and according to the present invention the amount of black liquor soap should be less than 0.01%, preferably of the order of 0.001–0.002%.

Not only is it possible to use very small amounts of black liquor soap to obtain satisfactory increases in plasticity, but the material itself is extremely cheap so that practically no additional cost is added to cement plasticized with the black liquor soap of the present invention.

The black liquor soap may be added to the cement prior to or during mixing, or may be incorporated during grinding of the cement clinker. Care should be taken, however, to obtain a uniform distribution of the black liquor soap as an uneven distribution may produce weak spots. For this purpose when black liquor soap is to be used as an addition to the cement during mixing, it is advantageous to mix it with a neutral diluent such as kieselguhr, fine sand, or the like, which makes it easier to obtain uniform distribution of such small quantities of the material in cement work where small mixing batches are employed.

The invention will be described in greater detail in conjunction with the following specific examples in which the Portland cement mix was made up as follows:

Example 1

| | Parts |
|---|---|
| Portland cement | 2041 |
| Sand (—8 mesh) | 6123 |
| Water | 1210 |

This mixture was divided up into a number of portions, one of which was used as a control. To one batch there was added 0.001% crude black liquor soap. The concrete showed an 83% increase in slump over the control. At the end of 7 days the change in strength was —7.9% and after 28 days, —6.7% as compared with the control for the same length of time.

Example 2

A further portion of the mix described in Example 1 was treated with 0.002% of washed black liquor soap, care being taken as in the first example that admixture was thorough and uniform. The mixture showed a 78% increase in slump with a strength of —4.6% and —14.5% after 7 and 28 days respectively.

What I claim is:

1. A method of increasing the plasticity of a Portland cement water mixture which comprises adding thereto from 0.001% to 0.01% of black liquor soap, said percentage being based on the amount of dry Portland cement contained in the wet mixture.

2. A Portland cement composition comprising Portland cement having admixed therewith from 0.001% to 0.01% of black liquor soap.

ROBERT BEN BOOTH.